US012656885B2

(12) United States Patent
Lu

(10) Patent No.: US 12,656,885 B2
(45) Date of Patent: Jun. 16, 2026

(54) EVALUATION DEVICE AND METHOD FOR ORIENTATION ESTIMATION FOR TWO SENSOR UNITS ARRANGED ON AN OBJECT

(71) Applicant: Robert Bosch GmbH, Stuttgart (DE)

(72) Inventor: Ye Lu, Walddorfaeslach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 399 days.

(21) Appl. No.: 18/358,214

(22) Filed: Jul. 25, 2023

(65) Prior Publication Data

US 2024/0061519 A1 Feb. 22, 2024

(30) Foreign Application Priority Data

Aug. 5, 2022 (DE) ........................ 10 2022 208 160

(51) Int. Cl.
| | |
|---|---|
| *G06F 3/0346* | (2013.01) |
| *G06F 3/01* | (2006.01) |
| *H04R 1/10* | (2006.01) |

(52) U.S. Cl.
CPC ............ *G06F 3/0346* (2013.01); *G06F 3/012* (2013.01); *G06F 3/017* (2013.01); *H04R 1/1016* (2013.01); *H04R 1/1041* (2013.01)

(58) Field of Classification Search
CPC ........ G06F 3/0346; G06F 3/012; G06F 3/017; H04R 1/1016; H04R 1/1041; H04R 2201/10
See application file for complete search history.

(56) References Cited

U.S. PATENT DOCUMENTS

| | | | | |
|---|---|---|---|---|
| 6,993,451 B2 * | 1/2006 | Chang | .................. | G06F 3/0346 |
| | | | | 702/153 |
| 8,781,776 B2 * | 7/2014 | Onda | .................... | G01C 21/28 |
| | | | | 702/94 |
| 9,494,428 B2 * | 11/2016 | Mizuochi | ................ | G01S 19/42 |

(Continued)

FOREIGN PATENT DOCUMENTS

| | | | | | |
|---|---|---|---|---|---|
| CN | 101389967 B | * | 8/2011 | .............. | G01P 13/02 |
| CN | 111649742 A | * | 9/2020 | ........... | G01C 21/206 |

(Continued)

*Primary Examiner* — Tung S Lau
(74) *Attorney, Agent, or Firm* — NORTON ROSE FULBRIGHT US LLP

(57) ABSTRACT

An evaluation device and method for orientation estimation for two sensor units arranged on an object. The method including: ascertaining a sensor transformation matrix from a first sensor coordinate system fixed to a first sensor unit into a second sensor coordinate system fixed to a second sensor unit; transforming a first acceleration vector measured using the first sensor unit into the second sensor coordinate system; and defining a first axis $\tilde{x}$ located in the second sensor coordinate system, corresponds to a first coordinate x of an object coordinate system extending through the first sensor unit and the second sensor unit, the object coordinate system being fixed to the object, based on the second angular velocity vector, its time derivative, and a difference vector between a second acceleration vector measured using the second sensor unit minus the first acceleration vector transferred into the second sensor coordinate system.

12 Claims, 2 Drawing Sheets

(56)          References Cited

U.S. PATENT DOCUMENTS

| | | | | |
|---|---|---|---|---|
| 10,881,331 B2 * | 1/2021 | Yu | ........................ | A61B 5/1135 |
| 2017/0192521 A1 * | 7/2017 | Jafari | ...................... | G06F 3/017 |
| 2017/0281058 A1 * | 10/2017 | Yu | ........................ | A61B 5/7214 |
| 2018/0091924 A1 | 3/2018 | Hammerschmidt | | |
| 2018/0288516 A1 | 10/2018 | Perry et al. | | |
| 2022/0252399 A1 * | 8/2022 | Terao | ...................... | G01P 21/00 |

FOREIGN PATENT DOCUMENTS

| | | | | |
|---|---|---|---|---|
| CN | 113436267 A * | 9/2021 | .............. | G06T 7/85 |
| DE | 102015219572 A1 | 4/2017 | | |
| DE | 102020109787 A1 | 10/2021 | | |
| DE | 102020208283 A1 | 1/2022 | | |

* cited by examiner

S1

$\vec{\omega}_2^2$

S6

$\overrightarrow{\omega_1^1} \qquad \overrightarrow{\omega_2^2}$ $\sim \vec{\omega}_1^1 \qquad \sim \vec{\omega}_2^2$

S2

$$\overrightarrow{\omega_2^2} = \overline{\overline{R_{sensor}}} * \overrightarrow{\omega_1^1}$$

$$\Delta\vec{a} = \overrightarrow{\omega_2^2} \times \overrightarrow{\omega_2^2} \times \vec{r}$$

$$+ \frac{d}{dt}\overrightarrow{\omega_2^2} \times \vec{r}$$

$\overline{\overline{R_{sensor}}}$ $\overrightarrow{a_1^1}$ $\overrightarrow{a_1^2}$ — S4

$\overrightarrow{a_1^2}$

S5

S3

$\overrightarrow{a_1^1}, \overrightarrow{a_2^2}$ $\Delta\vec{a} = \overrightarrow{a_2^2} - \overrightarrow{a_1^2}$ $\Delta\vec{a}$

S11

$\overrightarrow{\omega_2^2} \qquad \overrightarrow{a_2^2}$ $\sim \overrightarrow{\omega_2^2} \qquad \sim \overrightarrow{a_2^2}$ derive orientation
change information — S12

$\sim \tilde{x}$ $\sim 22$ $\overrightarrow{a_2^2}$ define second axis
taking into account
second acceleration
vector $\tilde{y}, \overline{\overline{R}}$ derive information
regarding movement

S7

$\overrightarrow{a_2^2}$

S8

$\tilde{z}$

S9,S10

$\tilde{x}, \tilde{y}, \tilde{z}, \overline{\overline{R}}$

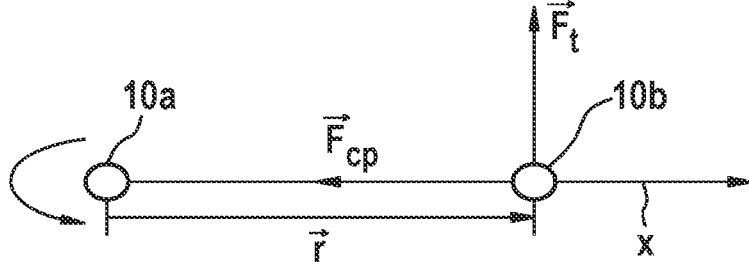

FIG. 2B

EVALUATION DEVICE AND METHOD FOR ORIENTATION ESTIMATION FOR TWO SENSOR UNITS ARRANGED ON AN OBJECT

CROSS REFERENCE

The present application claims the benefit under 35 U.S.C. § 119 of German Patent Application No. DE 10 2022 208 160.9 filed on Aug. 5, 2022, which is expressly incorporated herein by reference in its entirety.

FIELD

The present invention relates to an evaluation device for two sensor units arranged on an object. The present invention also relates to a system and an audio system. Furthermore, the present invention relates to a method for orientation estimation for two sensor units arranged on an object.

BACKGROUND INFORMATION

U.S. Patent Application No. US 2018/0091924 A1 describes a system for conveying information to a user with a pair of in-ear headphones. Moreover, the system requires several Wi-Fi access points by means of which the relative positions of the in-ear headphones on a head of the user are to be determinable.

SUMMARY

The present invention provides an evaluation device for two sensor units arranged on an object, an audio system, and a method for orientation estimation of two sensor units arranged on an object.

The present invention provides advantageous possibilities for estimating or determining an orientation of an object with two sensor units arranged thereon, relative to a sensor coordinate system fixed to one of the two sensor units. This may also be referred to as an estimation or determination of a misalignment between an object coordinate system fixed to the object and the sensor coordinate system fixed to one of the two sensor units. Likewise, this operation may also be described as a calibration. Advantageously, by using the present invention, it is also possible to estimate or determine the orientation of the respective object in relation to the sensor coordinate system of one of the two sensor units if each of the two sensor units is only designed to measure a (three-dimensional) angular velocity vector and to measure a (three-dimensional) acceleration vector. In order to apply the present invention, only a first angular velocity vector measured by means of the first sensor unit, a first acceleration vector measured by means of the first sensor unit, a second angular velocity vector measured by means of the second sensor unit, and a second acceleration vector measured by means of the second sensor unit are needed. Additional signals, such as Wi-Fi signals or GPS signals, are not needed to implement the present invention. The present invention can therefore also be used in a "Wi-Fi-free and GPS-free environment." Additionally, the non-use of Wi-Fi signals or GPS signals realized by means of the present invention contributes to reducing a power consumption required for the orientation estimation.

It is expressly pointed out that a feasibility of the present invention does not require a fixed orientation of the two sensor units on a connecting component arranged on the respective object. Instead, the two sensor units may be arranged one after the other and separately on the object. The object may also be a body part of a user, such as a head of the user or a hand of the user. A further advantage of the present invention is that the estimation or determination of the orientation of the object, such as the head or the hand, in relation to the sensor coordinate system of one of the two sensor units takes place automatically in a natural manner without the user having to perform a specific movement for this purpose. The present invention therefore provides possibilities for orientation estimation, which are very error-robust in comparison to conventional methods, which provide an incorrect calibration as a result of an incorrect movement of the user.

In an advantageous embodiment of the evaluation device according to the present invention, the electronic device is additionally designed and/or programmed to define a second axis $\tilde{z}$, which is located in the second sensor coordinate system, oriented perpendicularly to the first axis $\tilde{x}$ and corresponds to a second coordinate z of the object coordinate system running centrally between the first sensor unit and the second sensor unit, parallel to the axis of gravity and perpendicularly to the first coordinate x, taking into account a second acceleration vector $$\vec{a_2^2}$$

measured during standstill of the object and located in the second sensor coordinate system. The embodiment described here of the evaluation device thus uses the direction of gravity to inexpensively define the second axis $\tilde{z}$ in the second sensor coordinate system.

Preferably, the electronic device is additionally designed and/or programmed to define a third axis $\tilde{y}$, which is located in the second sensor coordinate system and oriented perpendicularly to the first axis $\tilde{x}$ and the second axis $\tilde{z}$, in such a way that the following applies: $\tilde{x} \times \tilde{y} = \tilde{z}$. By using the right-hand system, the third axis $\tilde{y}$ can thus also be defined in an inexpensive manner.

As an advantageous development of the present invention, the electronic device may additionally be designed and/or programmed to ascertain an object-sensor transformation matrix $\overline{R}$ from the object coordinate system into the second sensor coordinate system on the basis of the defined first axis $\tilde{x}$, the defined second axis $\tilde{z}$ and the defined third axis $\tilde{y}$. The object-sensor transformation matrix $\overline{R}$ can subsequently be advantageously used to define information regarding a movement of the object on the basis of first angular velocity and acceleration vectors $$\vec{\omega_1^1}$$

and $$\vec{a_1^1}$$

subsequently measured by means of the first sensor unit, and/or second angular velocity and acceleration vectors $$\vec{\omega_2^2}$$

US 12,656,885 B2

3 and $$\vec{a_2^2}$$

subsequently measured by means of the second sensor unit.

In a further advantageous embodiment of the evaluation device of the present invention, the electronic device is designed and/or programmed to cooperate with a first in-ear headphone, which comprises the first sensor unit and is arranged in a first ear of a head, and a second in-ear headphone, which comprises the second sensor unit and is arranged in a second ear of the head, in that the first axis x̃ corresponding to a first coordinate x of a head coordinate system extending through the first ear and through the second ear, the second axis z̃ corresponding to a second coordinate z of the head coordinate system extending centrally through a skullcap of the head, and the third axis ỹ corresponding to a third coordinate y of the head coordinate system extending from a back of the head to a nose of the head can be defined by means of the electronic device. The embodiment described here of the evaluation device can thus be reliably used to determine the misalignment between the head coordinate system and the second sensor coordinate system.

Preferably, in this case, the electronic device is also designed and/or programmed to ascertain a head-sensor transformation matrix from the head coordinate system into the second sensor coordinate system on the basis of the defined first axis x̃, the defined second axis z̃ and the defined third axis ỹ. Defining the head-sensor transformation matrix can in this case be simply and reliably performed for the head of the user, without the user having to perform particular gestures with their head.

As an advantageous development of the evaluation device of the present invention, the electronic device can additionally be designed and/or programmed to define and output information regarding gestures performed by the head, taking into account the defined first axis x̃, the defined second axis z̃ and the defined third axis ỹ and/or taking into account the defined head-sensor transformation matrix and on the basis of first angular velocity and acceleration vectors $$\vec{\omega_1^1}$$

and $$\vec{a_1^1}$$

subsequently measured by means of the first sensor unit, and/or second angular velocity and acceleration vectors $$\vec{\omega_2^2}$$

and $$\vec{a_2^2}$$

4 subsequently measured by means of the second sensor unit. In this case, for example, the evaluation device can advantageously cooperate with a control device, which controls at least one further component and/or at least one function of a mobile device, e.g., specifically, a wearable or a hearable, on the basis of the information output by the evaluation device regarding the gestures performed by the head. By their head movement, the user can then indicate a preferred function of the mobile device, which can reliably be implemented due to the relatively accurate estimate of the head orientation that is possible by means of the embodiment described here of the evaluation device.

Preferably, according to an example embodiment of the present invention, the electronic device is designed and/or programmed to define a radius vector $\vec{r}$ located in the second sensor coordinate system, taking into account the second angular velocity vector $$\vec{\omega_2^2}$$

located in the second sensor coordinate system, the time derivative $$\frac{d}{dt}\vec{\omega_2^2}$$

of the second angular velocity vector $$\vec{\omega_2^2}$$

located in the second sensor coordinate system, and the difference vector $\Delta\vec{a}$ located in the second sensor coordinate system, in such a way that the following applies:

$$\Delta\vec{a} = \vec{\omega_2^2} \times \vec{\omega_2^2} \times \vec{r} + \frac{d}{dt}\vec{\omega_2^2} \times \vec{r},$$

wherein the electronic device is designed and/or programmed to define the first axis x̃ in such a way that the radius vector $\vec{r}$ is located on the first axis x̃. The use, realized in the embodiment described here of the evaluation device, of knowledge of accelerations caused by rotations allows the first axis x̃ to be defined reliably.

Alternatively or additionally, the electronic device can also be designed and/or programmed to ascertain the sensor transformation matrix $\overline{R_{sensor}}$, taking into account the first angular velocity vector $$\vec{\omega_1^1}$$

located in the first sensor coordinate system, and the second angular velocity vector $$\vec{\omega_2^2}$$

located in the second sensor coordinate system, such that the following applies:

$$\overrightarrow{\omega_2^2} = \overline{\overline{R_{sensor}}} * \overrightarrow{\omega_1^1},$$

and to transform the first acceleration vector $$\overrightarrow{a_1^1}$$

from the first sensor coordinate system into the second sensor coordinate system according to:

$$\overrightarrow{a_1^2} = \overline{\overline{R_{sensor}}} * \overrightarrow{a_1^1}.$$

The first acceleration vector $$\overrightarrow{a_1^2}$$

transformed from the first sensor coordinate system into the second sensor coordinate system can then be reliably used to define the first axis x̃.

According to an example embodiment of the present invention, a system with such an evaluation device, the first sensor unit and the second sensor unit also realizes the advantages described above.

Likewise, the advantages described above are also ensured in an audio system with a corresponding evaluation device, the first in-ear headphone, which comprises the first sensor unit and can be arranged in a first ear of a head, and the second in-ear headphone, which comprises the second sensor unit and can be arranged in a second ear of the head.

Furthermore, performing a corresponding method for orientation estimation for two sensor units arranged on an object also provides the advantages explained above. It is expressly pointed out that the method for orientation estimation can be developed according to the embodiments described above of the evaluation device.

BRIEF DESCRIPTION OF THE DRAWINGS

Further features and advantages of the present invention are explained below with reference to the figures.

FIGS. 2A and 2B show a flow chart and a force chart for explaining an embodiment of the method for orientation estimation for two sensor units arranged on an object, according to the present invention.

DETAILED DESCRIPTION EXAMPLE EMBODIMENTS

Figure 1:
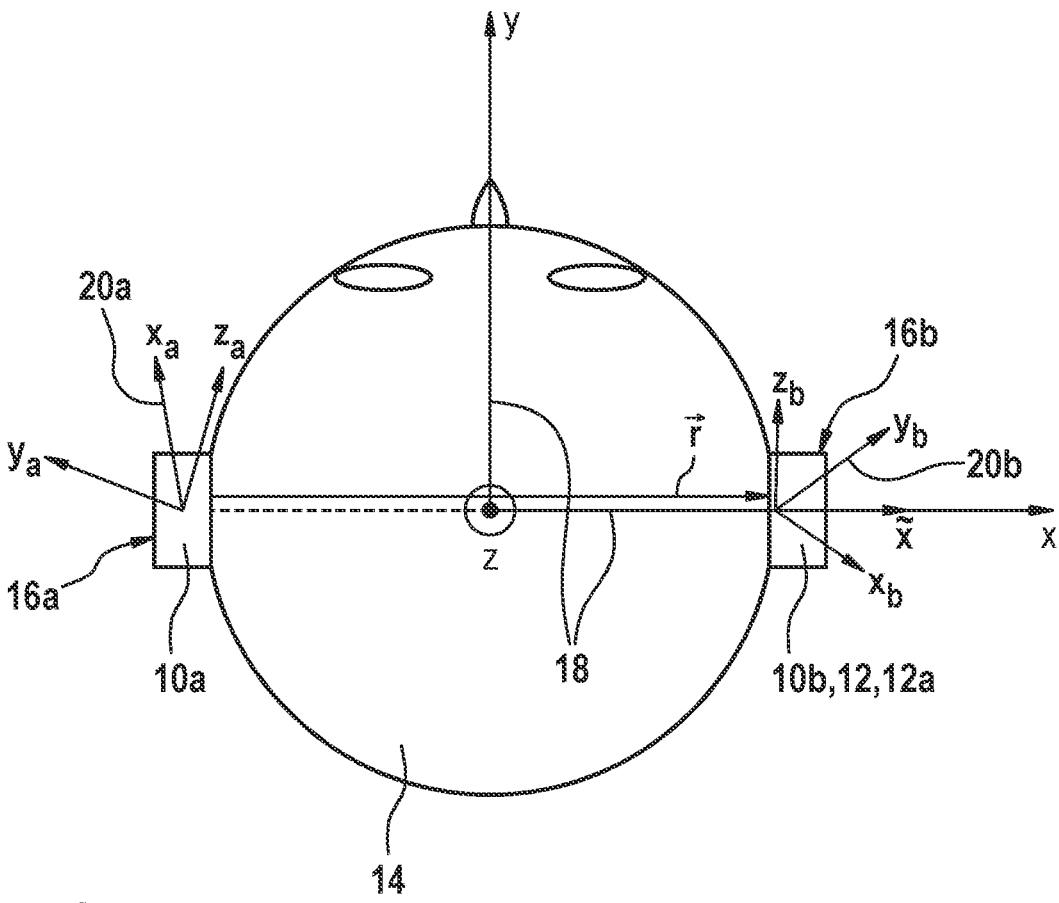
FIG. 1 shows a schematic representation of a system equipped with an embodiment of the evaluation device and two sensor units, according to the present invention.

FIG. 1 shows a schematic representation of a system equipped with an embodiment of the evaluation device and two sensor units.

The system shown schematically in FIG. 1 comprises a first sensor unit 10a, a second sensor unit 10b and an evaluation device 12 cooperating with the two sensor units 10a and 10b. The first sensor unit 10a and the second sensor unit 10b are arrangeable/arranged separately from one another on an object 14. For example, the first sensor unit 10a may be formed with a first housing and the second sensor unit 10b may be formed with a second housing, wherein a shape of the two housings of the sensor units 10a and 10b facilitates an arrangement on or attachment to the respective object 14. The object 14 may in particular be a body part 14 of a user, e.g., specifically, a head 14 or a hand of the user. The system can therefore be advantageously used as a mobile device or a wearable. For example, on the head 14 of the user, the first sensor unit 10a may be arranged as part of a first in-ear headphone 16a in a first ear (not outlined) of the head 14, while the second sensor unit 10b is inserted as part of a second in-ear headphone 16b in a second ear (not shown) of the head 14. The term "system" can therefore also be understood to mean an audio system (hearable). Alternatively, however, the system may also realize a different type of device.

The first sensor unit 10a and the second sensor unit 10b are each designed to measure a (three-dimensional) first/second angular velocity vector or rotation rate vector $$\overrightarrow{\omega_1^1}$$

or $$\overrightarrow{\omega_2^2}$$

and a (three-dimensional) first/second acceleration vector $$\overrightarrow{a_1^1}$$

or $$\overrightarrow{a_2^2}.$$

The first sensor unit 10a may thus be designed as a first angular velocity and acceleration sensor unit or rotation rate and acceleration sensor unit 10a, while the second sensor unit 10b is a second angular velocity and acceleration sensor unit or rotation rate and acceleration sensor unit 10b. Designing the first sensor unit 10a or of the second sensor unit 10b to measure a further physical quantity is not necessary. The first sensor unit 10a and the second sensor unit 10b can be designed inexpensively as MEMS (micro-electromechanical system), in particular as IMU (inertial measurement unit), specifically as 6Dof-IMU (inertial measurement unit with six degrees of freedom, 6 degrees of freedom inertial measurement unit).

As shown schematically in FIG. 1, for the object 14, an object coordinate system 18 fixed to the object 14 can be defined with three coordinates, x, y, and z. In the head 14 shown in FIG. 1, a first coordinate x of the object coordinate system 18, which can be referred to as the head coordinate system 18, extends through the first ear and the second ear of the head 14, while a second coordinate z of the head coordinate system 18 extends centrally through a skullcap of the head 14 and a third coordinate y of the head coordinate system 18 runs from a back of the head 14 to a nose of the head 14. A so-called radius vector $\vec{r}$, which runs from the first sensor unit 10*a* to the second sensor unit 10*b*, is thus located on the first coordinate x. For the first sensor unit 10*a*, a first sensor coordinate system 20*a* fixed to the first sensor unit 10*a* is defined with the sensor coordinates $x_a$, $y_a$ and $z_a$, which is why a first angular velocity vector or rotation rate vector $$\vec{\omega_1^1}$$

measured by means of the first sensor unit 10*a*, and a first acceleration vector $$\vec{a_1^1}$$

measured by means of the first sensor unit 10*a* are located in the first sensor coordinate system 20*a* of the first sensor unit 10*a*. The term "first angular velocity vector" is furthermore understood to mean a "first angular velocity vector or rotation rate vector." For the second sensor unit 10*b* as well, a second sensor coordinate system 20*b* fixed to the second sensor unit 10*b* is defined with the further sensor coordinates $x_b$, $y_b$ and $z_b$ such that a second angular velocity vector or rotation rate vector $$\vec{\omega_2^2}$$

measured by means of the second sensor unit 10*b*, and a second acceleration vector $$\vec{a_2^2}$$

measured by means of the second sensor unit 10*b* are located in the second sensor coordinate system 20*b* of the second sensor unit 10*b*. The term "second angular velocity vector" is also furthermore to be understood as a "second angular velocity vector or rotation rate vector."

It is expressly pointed out that due to the advantageous design/programming described below of the evaluation device 12, the orientations of the object coordinate system 18, of the first sensor coordinate system 20*a* and of the second sensor coordinate system 20*b* can deviate from one another as desired, and an offset between the object coordinate system 18 and the second sensor coordinate system 20*b*, a so-called misalignment, can still be reliably and accurately ascertained by means of the evaluation device 12. This may also be referred to as a calibration, by means of which the misalignment can be determined and the orientation of the object coordinate system 18, or the orientation of the object 14, can subsequently be derived from the orientation of the second sensor coordinate system 20*b*. Accordingly, a further offset between the object coordinate system 18 and the first sensor coordinate system 20*a* could also be determined.

Merely by way of example, in the embodiment of FIG. 1, the evaluation device 12 is integrated in one of the housings of the sensor units 10*a* and 10*b*, specifically in the second housing of the second sensor unit 10*b*. Alternatively, the evaluation device 12 can also be integrated separately from the housings of the sensor units 10*a* and 10*b* into a further housing.

The evaluation device 12 may be designed for wireless data transmission and/or for cabled data transmission from the sensor units 10*a* and 10*b* so that the first angular velocity vector $$\vec{\omega_1^1}$$

measured by means of the first sensor unit 10*a*, the first acceleration vector $$\vec{a_1^1}$$

measured by means of the first sensor unit 10*a*, the second angular velocity vector $$\vec{\omega_2^2}$$

measured by means of the second sensor unit 10*b*, and the second acceleration vector $$\vec{a_2^2}$$

measured by means of the second sensor unit 10*b* can be provided to an electronic device 12*a* of the evaluation device 12. The electronic device 12*a* is then designed and/or programmed to ascertain a sensor transformation matrix $\overline{\overline{R_{sensor}}}$ from the first sensor coordinate system 20*a* into the second sensor coordinate system 20*b*, taking into account the first angular velocity vector $$\vec{\omega_1^1}$$

located in first sensor coordinate system 20*a*, and the second angular velocity vector $$\vec{\omega_2^2}$$

measured simultaneously but located in the second sensor coordinate system 20*b*. By means of the ascertained sensor transformation matrix $\overline{\overline{R_{sensor}}}$, any vector can thus be transformed from the first sensor coordinate system 20*a* into the second sensor coordinate system 20*b*.

The electronic device 12*a* can therefore subsequently also transform the first acceleration vector $$\vec{a_1^1}$$

located in the first sensor coordinate system 20*a* from the first sensor coordinate system 20*a* into the second sensor coordinate system 20*b* using the ascertained sensor transformation matrix $\overline{\overline{R_{sensor}}}$. The first acceleration vector $$\overrightarrow{a_1^1}$$

transferred into the second sensor coordinate system 20*b*, and the second acceleration vector $$\overrightarrow{a_2^2}$$

measured simultaneously with the first acceleration vector $$\overrightarrow{a_1^1}$$

are now both located in the second sensor coordinate system 20*b*. Thereafter, the electronic device 12*a* is designed and/or programmed to define a difference vector $\Delta \overrightarrow{a}$, located in the second sensor coordinate system 20*b*, between the second acceleration vector $$\overrightarrow{a_2^2}$$

minus the first acceleration vector $$\overrightarrow{a_1^2}$$

transferred into the second sensor coordinate system 20*b*. Likewise, a time derivative $$\frac{d}{dt}\overrightarrow{\omega_2^2}$$

of the second angular velocity vector $$\overrightarrow{\omega_2^2},$$

which is also located in the second sensor coordinate system 20*b*, can be determined by means of the second angular velocity vector $$\overrightarrow{\omega_2^2}$$

located in the second sensor coordinate system 20*b*. Taking into account at least the difference vector $\Delta \overrightarrow{a}$, the second angular velocity vector $$\overrightarrow{\omega_2^2}$$

and the time derivative $$\frac{d}{dt}\overrightarrow{\omega_2^2},$$

a first axis x̃ located in the second sensor coordinate system 20*b* is subsequently definable/defined by means of the electronic device 12*a*, which first axis corresponds to the first coordinate x of the object coordinate system/head coordinate system 18 extending through the first sensor unit 10*a* and the second sensor unit 10*b*. A particularly advantageous procedure for defining the first axis x̃ is discussed below.

The electronic device 12*b* may additionally be designed/programmed to perform at least some of the method steps described below.

FIGS. 2A and 2B show a flow chart and a force chart for explaining an embodiment of the method for orientation estimation for two sensor units arranged on an object.

The method described below is performed, by way of example, using the above-explained sensor units 10*a* and 10*b*, which are arranged on an object 14 embodied as the head 14 of a user. It is however pointed out that a feasibility of the method for orientation estimation is limited neither to this type of object nor to this type of sensor.

In a method step S1, a first angular velocity vector or rotation rate vector $$\overrightarrow{\omega_1^1}$$

located in the first sensor coordinate system 20*a* is measured by means of the first sensor unit 10*a*, and a second angular velocity vector or rotation rate vector $$\overrightarrow{\omega_2^2}$$

located in the second sensor coordinate system 20*b* is simultaneously measured by means of the second sensor unit 10*b*. The terms "first angular velocity vector" and "second angular velocity vector" are furthermore understood to mean a "first angular velocity vector or rotation rate vector" or a "second angular velocity vector or rotation rate vector." As already explained above, the first sensor coordinate system 20*a* is fixed to the first sensor unit 10*a*, while the second sensor coordinate system 20*b* is fixed to the second sensor unit 10*b*. It is also pointed out that the method step S1 is performed while both sensor units 10*a* and 10*b* are/remain attached to the object 14.

In a further method step S2, a sensor transformation matrix $\overline{R_{sensor}}$ from the first sensor coordinate system 20*a* into the second sensor coordinate system 20*b* is ascertained. Ascertaining the sensor transformation matrix $\overline{R_{sensor}}$ takes place taking into account the first angular velocity vector $$\overrightarrow{\omega_1^1}$$

measured by means of the first sensor unit 10*a*, and the second angular velocity vector $$\overrightarrow{\omega_2^2}$$

measured simultaneously by means of the second sensor unit 10*b*. The sensor transformation matrix $\overline{\overline{R_{sensor}}}$ may in particular be ascertained taking into account the first angular velocity vector $$\vec{\omega_1^1}$$

and the second angular velocity vector $$\vec{\omega_2^2},$$

such that equation (Eq. 1) applies:

$$\vec{\omega_2^2} = \overline{\overline{R_{sensor}}} * \vec{\omega_1^1}, \qquad \text{(Eq. 1)}$$

The method described here also comprises a method step S3 in which a first acceleration vector $$\vec{a_1^1}$$

located in the first sensor coordinate system 20*a* is measured by means of the first sensor unit 10*a* and a second acceleration vector $$\vec{a_2^2}$$

located in the second sensor coordinate system 20*b* is simultaneously measured by means of the second sensor unit 10*b*. The method step S3 is preferably performed simultaneously with the method step S1. During the method step S3 as well, both sensor units 10*a* and 10*b* are/remain attached to the object 14.

After performing the method steps S2 and S3, the first acceleration vector $$\vec{a_1^1}$$

(measured in the method step S3) is transformed, in a method step S4, from the first sensor coordinate system 20*a* into the second sensor coordinate system 20*b* using the sensor transformation matrix $\overline{\overline{R_{sensor}}}$ (ascertained in the method step S2). The first acceleration vector transformed into the second sensor coordinate system 20*b* is represented in the flow chart of FIG. 2 by means of reference sign $$\vec{a_1^2}.$$

The transformation of the first acceleration vector $$\vec{a_1^1}$$

from the first sensor coordinate system 20*a* into the second sensor coordinate system 20*b* can in particular take place according to equation (Eq. 2):

$$\vec{a_1^2} = \overline{\overline{R_{sensor}}} * \vec{a_1^1}. \qquad \text{(Eq. 2)}$$

In a method step S5 of the flow chart of FIG. 2*a*, a difference vector $\Delta\vec{a}$ between the second acceleration vector $$\vec{a_2^2}$$

located in the second sensor coordinate system 20*b* minus the first acceleration vector $$\vec{a_1^2}$$

transferred into the second sensor coordinate system 20*b* is determined. The difference vector $\Delta\vec{a}$ is thus located in the second sensor coordinate system 20*b*.

The difference vector $\Delta\vec{a}$ can subsequently be used in a method step S6 to define a first axis $\tilde{x}$ located in the second sensor coordinate system 20*b*, which first axis corresponds to a first coordinate x of the object coordinate system 18 extending through the first sensor unit 10*a* and the second sensor unit 10*b*. As already explained above, the object coordinate system 18 is to be understood as a reference system fixed to the object 14. In addition to the difference vector $\Delta\vec{a}$, at least the second angular velocity vector $$\vec{\omega_2^2}$$

and a time derivative $$\frac{d}{dt}\vec{\omega_2^2}$$

of the second angular velocity vector $$\vec{\omega_2^2}$$

are also taken into account when defining the first axis $\tilde{x}$. Since the difference vector $\Delta\vec{a}$, the second angular velocity vector $$\vec{\omega_2^2}$$

and the time derivative $$\frac{d}{dt}\vec{\omega_2^2}$$

are all located in the second sensor coordinate system 20*b*, the method step S6 can be performed reliably.

As shown schematically in FIG. 2*b*, for performing the method step S6, a radius vector $\vec{r}$, which is located on the first coordinate x and extends from the first sensor unit 10*a* to the second sensor unit 10*b*, can be ascertained. Since the two sensor units 10*a* and 10*b* in each case have the same distance from one another when the method steps S1 and S3 are performed, the difference vector $\Delta\vec{a}$ results from a sum of the centrifugal force $F_{cp}$ and the Euler force $F_t$. The radius vector $\vec{r}$ can therefore be determined according to equation (Eq. 3), taking into account the second angular velocity vector $$\vec{\omega_2},$$

the time derivative $$\frac{d}{dt}\vec{\omega_2}$$

and the difference vector $\Delta\vec{a}$:

$$\Delta\vec{a} = \vec{\omega_2} \times \vec{\omega_2} \times \vec{r} + \frac{d}{dt}\vec{\omega_2} \times \vec{r} \qquad \text{(Eq. 3)}$$

The radius vector $\vec{r}$ may be calculated according to equation (Eq. 3) or may be defined by means of an adaptive solution of equation (Eq. 3). Since the second angular velocity vector $$\vec{\omega_2},$$

its time derivative $$\frac{d}{dt}\vec{\omega_2}$$

and the difference vector $\Delta\vec{a}$ are each located in the second sensor coordinate system 20*b*, the radius vector $\vec{r}$ is also defined, according to equation (Eq. 3), in the second sensor coordinate system 20*b*.

It is expressly pointed out that no specific/particular movement must be performed by the object 14 while the first axis x̃ is being defined by means of the method steps S1 to S6. As already explained above, the object 14 may be the head 14, in whose first ear a first in-ear headphone 16*a* comprising the first sensor unit 10*a* is arranged and in whose second ear a second in-ear headphone 16*b* comprising the second sensor unit 10*b* is arranged. In this case, the first axis x̃ corresponds to a first coordinate x of the object coordinate system 18 extending through the first ear and the second ear, which object coordinate system may also be referred to as the head coordinate system 18. However, even in this case, the user may move their head 14 naturally and according to their personal wishes, without a reliable performance of the method steps S1 to S6 being hindered or impaired thereby.

Optionally, the method may also comprise a method step S7 in which a further second acceleration vector $$\vec{a_2}$$

located in the second sensor coordinate system 20*b* is measured by means of the second sensor unit 10*b* during a standstill of the object 14. During the standstill of the object 14, only the gravitational force, which is oriented in the direction of the axis of gravity/direction of gravity, acts on the second sensor unit 10*b*. This may be used to define a second axis z̃, which is located in the second sensor coordinate system 20*b*, oriented perpendicularly to the first axis x̃, and corresponds to a second coordinate z of the object coordinate system 18 running centrally between the first sensor unit 10*a* and the second sensor unit 10*b*, parallel to the axis of gravity, and perpendicularly to the first coordinate x. If the object 14 is the head 14 of the user, the second axis z̃ corresponds to a second coordinate z of the head coordinate system 18 extending centrally through a skullcap of the head 14.

The method described here therefore also comprises an (optional) method step S8, in which the second axis z̃ is defined taking into account the second acceleration vector $$\vec{a_2}$$

measured in the method step S7 during a standstill of the object 14. Optionally, for performing the method steps S7 and S8, the user may be encouraged to keep their head 14 straight for a short time. Alternatively, for performing the method steps S7 and S8, waiting for a period of time in which the head 14 of the user rests in its natural position because the user is looking straight ahead and holding the head 14 straight at their own volition may also take place. After performing the method step S8, it may optionally be checked whether the second axis z̃ is oriented perpendicularly to the previously determined first axis x̃. In this way, it can be verified that the object/head 14 was actually at a standstill during the performance of the method step S7.

In a further (optional) method step S9, a third axis ỹ located in the second sensor coordinate system 20*b* and oriented perpendicularly to the first axis x̃ and the second axis z̃ can additionally be defined. If the object 14 is the head 14, the third axis ỹ corresponds to a third coordinate y of the head coordinate system 18 running from a back of the head 14 to a nose of the head 14. Using the right-hand system, the third axis ỹ can be unambiguously determined by means of equation (Eq. 4):

$$\tilde{x} \times \tilde{y} = \tilde{z} \qquad \text{(Eq. 4)}$$

If desired, in an (optional) method step S10, an object-sensor transformation matrix $\overline{R}$ from the object coordinate system 18 into the second sensor coordinate system 20*b* may subsequently be ascertained on the basis of the defined first axis x̃, the defined second axis z̃, and the defined third axis ỹ. In particular, in the method step S10, a head-sensor transformation matrix $\overline{R}$ from the head coordinate system 18 into the second sensor coordinate system 20*b* may be determined with respect to the head 14 of the user.

The method steps S1 to S10 enable an advantageous auto-calibration for a device, such as a mobile device, specifically a wearable or a hearable. The method steps S1 to S10 can be repeated at every start-up of the device, during/after a movement of the sensor units 10a and 10b relative to one another and/or several times/continuously during operation of the device, in particular at a specified frequency, in order to (almost) always have a correct calibration.

For example, the auto-calibration can be used in the manner described below:

As an advantageous development, the method described here also comprises the method steps S11 to S13, which can (optionally) be performed after performing the method steps S1 to S10. In a method step S11, the second angular velocity vector $$\overrightarrow{\omega_2^2}$$

located in the second sensor coordinate system 20b, and the second acceleration vector $$\overrightarrow{a_2^2}$$

likewise located in the second sensor coordinate system 20b are measured again, as data, by means of the second sensor unit 10b. Subsequently, in a further method step S12, orientation change information 22 regarding an orientation change of the second sensor unit 10b can be derived from the measured data by using an algorithm, such as a sensor fusion algorithm.

In a further method step S13, information regarding a movement performed by the object 14 can be derived from the determined orientation change information 22. In particular, if the object 14 is the head 14 of the user, information regarding gestures performed by the head 14 can be defined on the basis of the orientation change information 22. Defining the information regarding the movement performed by the object 14 takes place taking into account the defined first axis x̃, the defined second axis z̃ and the defined third axis ỹ and/or taking into account the defined object-sensor transformation matrix or head-sensor transformation matrix $\overline{R}$.

As already explained above, the defined information regarding the gestures performed by the head 14 can subsequently be used to control a further component and/or a function of a system/device equipped or cooperating with the two sensor units 10a and 10b. In this way, the user is given the possibility of specifying control commands by performing gestures with their head 14, which control commands are detected/deciphered by means of the method steps S11 to S13.

What is claimed is:

1. An evaluation device for two sensor units arranged on an object, the evaluation device comprising:

an electronic device configured and/or programmed to:

ascertain a sensor transformation matrix $\overline{R_{sensor}}$ from a first sensor coordinate system fixed to a first sensor unit of the two sensor units into a second sensor coordinate system fixed to a second sensor unit of the two sensor units, taking into account a first angular velocity vector $$\overrightarrow{\omega_1^1}$$

measured using the first sensor unit and located in the first sensor coordinate system, and a second angular velocity vector $$\overrightarrow{\omega_2^2}$$

measured simultaneously using the second sensor unit and located in the second sensor coordinate system;

transform a first acceleration vector $$\overrightarrow{\alpha_1^1}$$

measured using the first sensor unit and located in the first sensor coordinate system, from the first sensor coordinate system into the second sensor coordinate system using the ascertained sensor transformation matrix $\overline{R_{sensor}}$; and define a first axis x̃ located in the second sensor coordinate system, which first axis corresponds to a first coordinate x of an object coordinate system extending through the first sensor unit and the second sensor unit, the object coordinate system being fixed to the object, at least taking into account the second angular velocity vector $$\overrightarrow{\omega_2^2}$$

located in the second sensor coordinate system, a time derivative $$\frac{d}{dt}\overrightarrow{\omega_2^2}$$

of the second angular velocity vector $$\overrightarrow{\omega_2^2}$$

located in the second sensor coordinate system, and a difference vector $\Delta\overrightarrow{a}$, located in the second sensor coordinate system, between a second acceleration vector $$\overrightarrow{a_2^2}$$

measured using the second sensor unit simultaneously with the first acceleration vector $$\overrightarrow{a_1^1}$$

and located in the second sensor coordinate system minus the first acceleration vector $$\vec{a_1^1}$$

transferred into the second sensor coordinate system.

2. The evaluation device according to claim 1, wherein the electronic device is additionally configured and/or programmed to define a second axis $\tilde{z}$, which is located in the second sensor coordinate system, oriented perpendicularly to the first axis $\tilde{x}$ and corresponds to a second coordinate z of the object coordinate system running centrally between the first sensor unit and the second sensor unit, parallel to an axis of gravity and perpendicularly to the first coordinate x, taking into account a second acceleration vector $$\vec{a_2^2}$$

measured during standstill of the object and located in the second sensor coordinate system.

3. The evaluation device according to claim 2, wherein the electronic device is additionally configured and/or programmed to define a third axis $\tilde{y}$, which is located in the second sensor coordinate system and oriented perpendicularly to the first axis $\tilde{x}$ and the second axis $\tilde{z}$, in such a way that the following applies:

$$\tilde{x} \times \tilde{y} = \tilde{z}.$$

4. The evaluation device according to claim 3, wherein the electronic device is configured and/or programmed to ascertain an object-sensor transformation matrix $\overline{R}$ from the object coordinate system into the second sensor coordinate system based on the defined first axis $\tilde{x}$, the defined second axis $\tilde{z}$, and the defined third axis $\tilde{y}$.

5. The evaluation device according to claim 3, wherein the electronic device is configured and/or programmed to cooperate with a first in-ear headphone, which includes the first sensor unit and is arranged in a first ear of a head, and a second in-ear headphone, which includes the second sensor unit and is arranged in a second ear of the head, the first axis $\tilde{x}$ corresponding to a first coordinate x of a head coordinate system extending through the first ear and through the second ear, the second axis $\tilde{z}$ corresponding to a second coordinate z of the head coordinate system extending centrally through a skullcap of the head, and the third axis $\tilde{y}$ corresponding to a third coordinate y of the head coordinate system extending from a back of the head to a nose of a head can be defined using the electronic device.

6. The evaluation device according to claim 5, wherein the electronic device is configured and/or programmed to ascertain a head-sensor transformation matrix from the head coordinate system into the second sensor coordinate system on the basis of the defined first axis $\tilde{x}$, the defined second axis $\tilde{z}$, and the defined third axis $\tilde{y}$.

7. The evaluation device according to claim 6, wherein the electronic device is configured and/or programmed to define and output information regarding gestures performed by the head, taking into account the defined first axis $\tilde{x}$, the defined second axis $\tilde{z}$, and the defined third axis $\tilde{y}$ and/or taking into account the defined head-sensor transformation matrix and based on the first angular velocity and acceleration vectors $$\vec{\omega_1^1}$$

and $$\vec{a_1^1}$$

subsequently measured using the first sensor unit (10*a*), and/or the second angular velocity and acceleration vectors $$\vec{\omega_2^2}$$

and $$\vec{a_2^2}$$

subsequently measured using the second sensor unit.

8. The evaluation device according to claim 1, wherein the electronic device is configured and/or programmed to define a radius vector $\vec{r}$ located in the second sensor coordinate system, taking into account the second angular velocity vector $$\vec{\omega_2^2}$$

located in the second sensor coordinate system, the time derivative $$\frac{d}{dt}\vec{\omega_2^2}$$

of the second angular velocity vector $$\vec{\omega_2^2}$$

located in the second sensor coordinate system, and the difference vector $\Delta\vec{a}$ located in the second sensor coordinate system, in such a way that the following applies:

$$\Delta\vec{a} = \vec{\omega_2^2} \times \vec{\omega_2^2} \times \vec{r} + \frac{d}{dt}\vec{\omega_2^2} \times \vec{r},$$

and wherein the electronic device is configured and/or programmed to define the first axis $\tilde{x}$ in such a way that the radius vector $\vec{r}$ is located on the first axis $\tilde{x}$.

9. The evaluation device according to claim 1, wherein the electronic device is configured and/or programmed to ascertain the sensor transformation matrix $\overline{R_{sensor}}$, taking into account the first angular velocity vector $$\vec{\omega_1^1}$$

located in the first sensor coordinate system and the second angular velocity vector $$\overrightarrow{\omega_2^2}$$

located in the second sensor coordinate system, such that the following applies:

$$\overrightarrow{\omega_2^2} = \overline{\overline{R_{sensor}}} * \overrightarrow{\omega_1^1},$$

and to transform the first acceleration vector $$\overrightarrow{a_1^1}$$

from the first sensor coordinate system into the second sensor coordinate system according to:

$$\overrightarrow{a_1^2} = \overline{\overline{R_{sensor}}} * \overrightarrow{a_1^1}.$$

10. A system comprising:
an evaluation device for two sensor units arranged on an object, the evaluation device comprising:
an electronic device configured and/or programmed to:
ascertain a sensor transformation matrix $\overline{\overline{R_{sensor}}}$ from a first sensor coordinate system fixed to a first sensor unit of the two sensor units into a second sensor coordinate system fixed to a second sensor unit of the two sensor units, taking into account a first angular velocity vector $$\overrightarrow{\omega_1^1}$$

measured using the first sensor unit and located in the first sensor coordinate system, and a second angular velocity vector $$\overrightarrow{\omega_2^2}$$

measured simultaneously using the second sensor unit and located in the second sensor coordinate system;
transform a first acceleration vector $$\overrightarrow{a_1^1}$$

measured using the first sensor unit and located in the first sensor coordinate system, from the first sensor coordinate system into the second sensor coordinate system using the ascertained sensor transformation matrix $\overline{\overline{R_{sensor}}}$; and
define a first axis $\tilde{x}$ located in the second sensor coordinate system, which first axis corresponds to a first coordinate x of an object coordinate system extending through the first sensor unit and the second sensor unit, the object coordinate system being fixed to the object, at least taking into account the second angular velocity vector $$\overrightarrow{\omega_2^2}$$

located in the second sensor coordinate system, a time derivative $$\frac{d}{dt}\overrightarrow{\omega_2^2}$$

of the second angular velocity vector $$\overrightarrow{\omega_2^2}$$

located in the second sensor coordinate system, and a difference vector $\Delta \overrightarrow{a}$, located in the second sensor coordinate system, between a second acceleration vector $$\overrightarrow{a_2^2}$$

measured using the second sensor unit simultaneously with the first acceleration vector $$\overrightarrow{a_1^1}$$

and located in the second sensor coordinate system minus the first acceleration vector $$\overrightarrow{a_1^2}$$

transferred into the second sensor coordinate system;
the first sensor unit; and
the second sensor unit.
11. An audio system comprising:
an evaluation device for two sensor units arranged on an object, the evaluation device comprising:
an electronic device configured and/or programmed to:
ascertain a sensor transformation matrix $\overline{\overline{R_{sensor}}}$ from a first sensor coordinate system fixed to a first sensor unit of the two sensor units into a second sensor coordinate system fixed to a second sensor unit of the two sensor units, taking into account a first angular velocity vector $$\overrightarrow{\omega_1^1}$$

measured using the first sensor unit and located in the first sensor coordinate system, and a second angular velocity vector $$\overrightarrow{\omega_2^2}$$

measured simultaneously using the second sensor unit and located in the second sensor coordinate system;

transform a first acceleration vector $$\vec{a_1^1}$$

measured using the first sensor unit and located in the first sensor coordinate system, from the first sensor coordinate system into the second sensor coordinate system using the ascertained sensor transformation matrix $\overline{R_{sensor}}$; and define a first axis $\tilde{x}$ located in the second sensor coordinate system, which first axis corresponds to a first coordinate x of an object coordinate system extending through the first sensor unit and the second sensor unit, the object coordinate system being fixed to the object, at least taking into account the second angular velocity vector $$\vec{\omega_2^2}$$

located in the of the second sensor coordinate system, a time derivative $$\frac{d}{dt}\vec{\omega_2^2}$$

of the second angular velocity vector $$\vec{\omega_2^2}$$

located in the second sensor coordinate system, and a difference vector $\Delta\vec{a}$, located in the second sensor coordinate system, between a second acceleration vector $$\vec{a_2^2}$$

measured using the second sensor unit simultaneously with the first acceleration vector $$\vec{a_1^1}$$

and located in the second sensor coordinate system minus the first acceleration vector $$\vec{a_1^2}$$

transferred into the second sensor coordinate system;

the first in-ear headphone, which includes the first sensor unit and can be arranged in a first ear of a head; and the second in-ear headphone, which includes the second sensor unit and can be arranged in a second ear of the head.

12. A method for orientation estimation for two sensor units arranged on an object, the method comprising the steps of:

ascertaining a sensor transformation matrix $\overline{R_{sensor}}$ from a first sensor coordinate system fixed to a first sensor unit of the two sensor units into a second sensor coordinate system fixed to a second sensor unit of the two sensor units, taking into account a first angular velocity vector $$\vec{\omega_1^1}$$

measured using the first sensor unit and located in the first sensor coordinate system ($20a$), and a second angular velocity vector $$\vec{\omega_2^2}$$

measured simultaneously using the second sensor unit and located in the second sensor coordinate system;

transforming a first acceleration vector $$\vec{a_1^1},$$

measured using the first sensor unit and located in the first sensor coordinate system, from the first sensor coordinate system into the second sensor coordinate system using the ascertained sensor transformation matrix $\overline{R_{sensor}}$; and defining a first axis $\tilde{x}$ located in the second sensor coordinate system, which first axis corresponds to a first coordinate x of an object coordinate system extending through the first sensor unit and the second sensor unit, the object coordinate system being fixed to the object, at least taking into account the second angular velocity vector $$\vec{\omega_2^2}$$

located in the second sensor coordinate system, a time derivative $$\frac{d}{dt}\vec{\omega_2^2}$$

of the second angular velocity vector $$\vec{\omega_2^2}$$

located in the second sensor coordinate system ($20b$), and a difference vector $\Delta\vec{a}$, located in the second sensor coordinate system, between a second acceleration vector 23 24

$$\overrightarrow{a_2^2}$$

measured using the second sensor unit simultaneously
with the first acceleration vector $$\overrightarrow{a_1^1}$$

and located in the second sensor coordinate system
minus the first acceleration vector $$\overrightarrow{a_1^2}$$

transferred into the second sensor coordinate system.

\* \* \* \* \*